F. GRAF.
GRAVITY TROLLEY RUDDER.
APPLICATION FILED DEC. 30, 1918. RENEWED APR. 23, 1921.
1,386,566.
Patented Aug. 2, 1921.
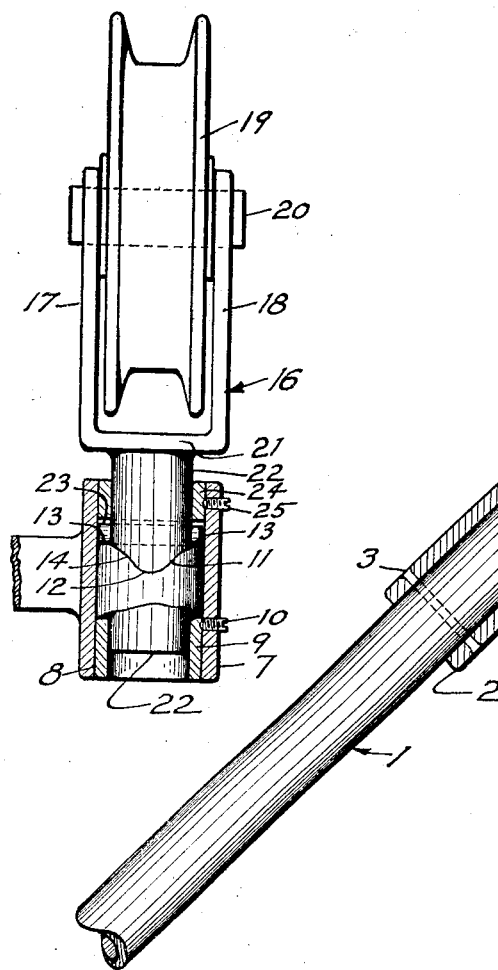
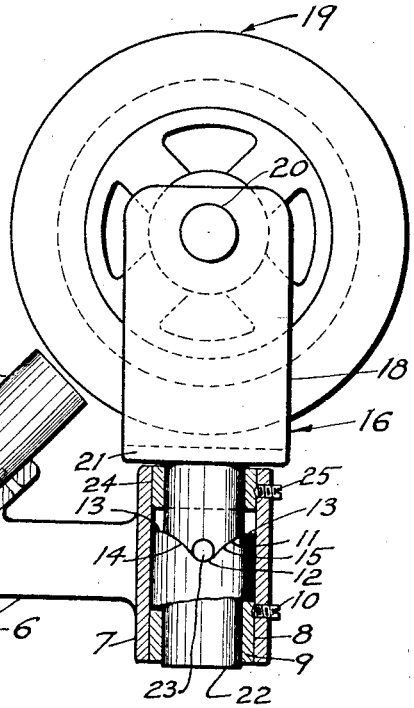
INVENTOR.
FRED GRAF.
BY Hazard & Miller
ATTORNEYS.

UNITED STATES PATENT OFFICE.

FRED GRAF, OF LANKERSHIM, CALIFORNIA, ASSIGNOR OF ONE-HALF TO GEORGE E. WALLACE, OF LOS ANGELES, CALIFORNIA.

GRAVITY TROLLEY-RUDDER.

1,386,566.  Specification of Letters Patent.  Patented Aug. 2, 1921.

Application filed December 30, 1918, Serial No. 268,958. Renewed April 23, 1921. Serial No. 463,909.

*To all whom it may concern:*

Be it known that I, FRED GRAF, a citizen of the United States, residing at Lankershim, in the county of Los Angeles and State of California, have invented new and useful Improvements in Gravity Trolley-Rudders, of which the following is a specification.

My object is to make a gravity trolley rudder, and my invention consists of the novel features herein shown, described and claimed.

The principal object of my invention is to mount a trolley wheel, so that the wheel will follow the wire, and so that when the wheel is out of contact with the wire the wheel will be automatically alined with the pole.

Figure 1 is a side elevation showing a gravity trolley rudder embodying the principles of my invention in position to connect a trolley wheel to a trolley pole, parts being broken away and shown in section.

Fig. 2 is a fragmentary view on the same plane as Fig. 1 with the trolley wheel turned at right angles to the position shown in Fig. 1.

Referring to the drawing in detail, the trolley pole 1 is preferably a straight pipe. The socket 2 fits upon the pole 1 like a sleeve, and pins 3 and 4 are inserted through the sleeve and through the pole to hold the sleeve rigidly in place upon the pole. The pole 1 extends some distance above the upper end of the socket 2 to form the guide 5. An arm 6 extends backwardly from the socket 2 in a substantially horizontal plane. The bearing 7 is a vertical sleeve at the rear end of the arm 6. Preferably the socket 2, the arm 6, and the bearing 7 are formed integral with the socket 2 at an angle of about 45° relative to the bearing 7. The bore 8 through the bearing 7 is straight. The supporting cam 9 is a straight sleeve fitting closely in the lower end of the bore 8 and held in place by a set screw 10. The cam face 11 upon the upper end of the sleeve is V-shaped so as to produce two low points 12 in diametrical alinement, and two high points 13, and inclined faces 14 and 15 connecting the low points to the high points. The trolley wheel fork 16 has arms 17 and 18 between which the trolley wheel 19 is mounted upon the spindle 20. The arms 17 and 18 extend from the crosshead 21, and the swiveled post 22 extends downwardly from the crosshead 21 and fits in the cam sleeve 9. A pin 23 is loosely mounted through the post 22, the length of the pin 23 being slightly less than the diameter of the bore 8, so that the pin will ride upon the cam 11. A retaining sleeve 24 is placed upon the post 22 before the pin 23 is inserted, and then the post 22 carrying the pin 23 and sleeve 24 is inserted downwardly into the bore 8 and turned, so that the pin 23 will rest upon the high points 13, as in Fig. 2, and then the set screw 25 is inserted through the bearing into the sleeve 24 to hold the sleeve in place, so that the post 22 cannot be withdrawn from the bearing. In assembling the parts, the supporting cam 9 is located, so that the wheel 19 will be in running line with the pole 1 when the roller 23 is down upon the low points, as in Fig. 1.

When the trolley pole is in operation, with the wheel 19 in engagement with the trolley wire, the wheel will follow the wire, and in doing this the pin 23 will travel upon the inclined faces 14 and 15 and raise the fork 16, as indicated in Fig. 2, and as soon as the wheel leaves the wire the force of gravity will cause the pin 23 to travel downwardly upon the inclined faces 14 and 15 to the low points 12, thus automatically bringing the trolley wheel 19 into alinement with the pole 1, so that when it is desired to again apply the trolley wheel to the trolley wire there is no liability of the wheel going crosswise of the wire.

In case where the trolley wheel is off the trolley wire and the car moving, a cross wire, or guy wire, striking the pole 1 will pass upwardly and backwardly along the pole 1 over the socket 2, over the guide 5, and upwardly over the wheel 19. The guide 5 serves to keep the guy wire, or cross wire, from passing backwardly against the fork 16 and being torn down by hooking under the wheel 19.

Thus I have produced a gravity trolley rudder for connecting a trolley wheel to a trolley pole, so that the wheel will turn and follow the trolley wire when in engagement with the wire, and so that the wheel will automatically assume its normal position in alinement with the pole when out of engagement with the wire.

Various changes may be made without departing from the spirit of my invention as claimed.

I claim:

A gravity trolley rudder comprising the combination with a straight pole, of a socket fitting upon the pole; pins inserted through the socket and through the pole, the socket being a fixed distance below the end of the pole; an arm extending backwardly from the socket substantially in a horizontal plane; a vertical bearing at the rear end of the arm and having a straight bore; a supporting cam comprising a straight sleeve fitting loosely in the lower end of the bore and held in place by a set screw and having a V-shaped upper end so as to produce two low points in diametrical alinement and two high points in diametrical alinement at right angles to the low points and inclined faces connecting the low points to the high points; a trolley wheel fork comprising a crosshead and arms extending upwardly from the crosshead; a swiveled post extending downwardly from the crosshead and fitting loosely in the cam sleeve; a pin mounted loosely through the swiveled post and resting upon the cam face; a retaining sleeve mounted on the post before the pin is inserted; a set screw for holding the retaining sleeve in place; a spindle inserted through the arms; and a trolley wheel upon the spindle, the periphery of the trolley wheel being close to the end of the pole so that the end of the pole serves as a guide to prevent the trolley wire from hooking under the wheel.

In testimony whereof I have signed my name to this specification.

FRED GRAF.